United States Patent
Bittlingmaier

(10) Patent No.: US 12,496,901 B2
(45) Date of Patent: Dec. 16, 2025

(54) WHEEL SIDE WITH OFFSET GEAR AND SEPARATE LUBRICATION SPACES

(71) Applicant: Kessler & Co. GmbH & Co. KG, Abtsgmünd (DE)

(72) Inventor: Günter Bittlingmaier, Aalen (DE)

(73) Assignee: Kessler & Co. GmbH & Co. KG, Abtsgmünd (DE)

( * ) Notice: Subject to any disclaimer, the term of this patent is extended or adjusted under 35 U.S.C. 154(b) by 269 days.

(21) Appl. No.: 18/233,991

(22) Filed: Aug. 15, 2023

(65) Prior Publication Data

US 2024/0066980 A1    Feb. 29, 2024

(30) Foreign Application Priority Data

Aug. 24, 2022    (DE) .................. 102022121426.5

(51) Int. Cl.
*B60K 17/04*    (2006.01)

(52) U.S. Cl.
CPC .................. *B60K 17/043* (2013.01)

(58) Field of Classification Search
CPC .................................................... B60K 17/043
See application file for complete search history.

(56) References Cited

U.S. PATENT DOCUMENTS

| | | | | |
|---|---|---|---|---|
| 1,824,793 A | * | 9/1931 | Riise | B60K 17/043 74/390 |
| 2,776,019 A | * | 1/1957 | Keese | B60K 17/043 180/370 |
| 3,862,667 A | | 1/1975 | Wolansky | |
| 6,148,940 A | * | 11/2000 | Hokanson | B60K 7/0007 180/65.6 |
| 6,676,228 B1 | * | 1/2004 | Varela | B60K 17/043 301/124.1 |
| 2017/0129331 A1 | | 5/2017 | Naitou | |
| 2017/0190214 A1 | * | 7/2017 | Grimminger | B60T 1/065 |
| 2018/0056775 A1 | * | 3/2018 | Fukudome | B60K 17/043 |

FOREIGN PATENT DOCUMENTS

| | | |
|---|---|---|
| CN | 110588310 A | 12/2019 |
| DE | 10052952 A1 | 5/2002 |
| DE | 102004043285 A1 | 3/2006 |
| DE | 102004043286 A1 | 3/2006 |

(Continued)

*Primary Examiner* — Edwin A Young
(74) *Attorney, Agent, or Firm* — Dickinson Wright PLLC

(57) ABSTRACT

A wheel side includes an offset gear with an output axis, which is offset with respect to an input axis, for outputting drive power; a hub carrier; a wheel hub supported at the hub carrier by a wheel support; and a driven shaft that extends along the output axis through the hub carrier and that connects the offset gear to the wheel hub. The wheel side has a first lubrication space, in which the offset gear is arranged, and a second lubrication space, in which the wheel support is arranged. The first lubrication space and the second lubrication space are separate and sealed relative to one another. A wheel hub gear that receives drive power from the driven shaft and to output said drive power to the wheel hub may be arranged in a third lubrication space, which is separate from the first and second lubrication space and sealed relative to the first and second lubrication space.

9 Claims, 2 Drawing Sheets

(56) References Cited

FOREIGN PATENT DOCUMENTS

| | | |
|---|---|---|
| DE | 102013209324 A1 | 11/2014 |
| DE | 102017122017 A1 | 3/2019 |
| DE | 102017222332 A1 | 6/2019 |
| EP | 1418068 A1 | 5/2004 |
| EP | 4155105 A1 | 3/2023 |
| JP | 2008184111 A | 8/2008 |

\* cited by examiner

WHEEL SIDE WITH OFFSET GEAR AND SEPARATE LUBRICATION SPACES

CROSS-REFERENCE TO RELATED APPLICATION

This application claims the benefit and priority of German Patent Application No. DE 102022121426.5 filed on Aug. 24, 2022. The entire disclosure of the above application is incorporated herein by reference.

FIELD OF THE INVENTION

The invention relates to a wheel side in which a drive power, which is in particular generated by a motor and which enters the wheel side, is first displaced from an input axis to an output axis by means of an offset gear and is then transmitted via a driven shaft to a wheel hub. The wheel hub is in this respect supported by means of a wheel support at a hub carrier through which the driven shaft extends.

BACKGROUND OF THE INVENTION

Due to the axle offset, difficulties for the lubrication of the components to be lubricated, in particular bearings and gears, of the wheel side may result. For it may, for example, be necessary that lubricant has to be conveyed along the axle offset, possibly against the force of gravity, and then forwarded to a plurality of points in order to reach all the components of the wheel side to be lubricated. For this purpose, known wheel sides often have complex lubricant courses that are expensive to implement; in some cases, lubricant pumps are also used.

Such a wheel side is known from DE 10 2013 209 324 A1 in which oil that lubricates the offset gear and is taken along by wheels of the offset gear along the axle offset is collected in an oil collecting chamber formed at the hub carrier and is directed from there via oil passages in the hub carrier into an additional oil sump provided directly at the driven shaft so that it wets the driven shaft and ultimately moves up to the wheel support along the driven shaft through the hub carrier.

SUMMARY OF THE INVENTION

It is an object of the invention to provide a wheel side having an offset gear and that avoids the disadvantages mentioned and in this respect enables a reliable and optimized lubrication of its components to be lubricated without complex lubricant courses and without lubricant pumps.

The object is satisfied by a wheel side having features of the present disclosure. Advantageous embodiments of the invention result from the claims, from the present description, and from the figures.

The wheel side in accordance with the invention comprises: an offset gear having an input coaxial to an input axis for receiving drive power and an output coaxial to an output axis, which is offset with respect to the input axis, for outputting the drive power; a hub carrier; a wheel hub supported at the hub carrier by means of a wheel support; and a driven shaft that extends along the output axis through the hub carrier and that connects the offset gear to the wheel hub in order to transmit the drive power from the offset gear to the wheel hub. In accordance with the invention, provision is made in this respect that the wheel side has a first lubrication space, in which the offset gear is arranged, and a second lubrication space, in which the wheel support is arranged, with the first lubrication space and the second lubrication space being separate from one another and sealed with respect to one another.

The input of the offset gear may, for example, be formed by a drive gear that is rotatably supported about the input axis. The output of the offset gear may be formed by a driven gear that is rotatably supported about the output axis. In this respect, the drive gear and the driven gear may mesh directly with one another so that the offset gear may substantially correspond to a simple spur gear set. In general, the offset gear may, however, also have a more complex design, wherein multiple gear ratios may also be provided in order, if necessary, to meet requirements with respect to the tractive force and speed to be achieved.

The input axis and the output axis are preferably in parallel with one another. In general, an angled alignment may, however, also be considered.

The hub carrier serves primarily for a stable support of the wheel hub and is preferably stationary in this respect. For this purpose, the hub carrier may in particular be rotationally fixedly connected to a housing of the wheel side and/or to an axle housing of a vehicle axle comprising the wheel side. The hub carrier may also be part of such an (axle) housing and may in particular be formed by a section of the (axle) housing.

The hub carrier may in particular be arranged such that the wheel hub may be rotated about the output axis by being supported at the hub carrier by means of the wheel support. The driven shaft is also preferably coaxial to the output axis so that the drive power is transmitted from the offset gear via the driven shaft to the wheel hub without any further axle offset.

In this respect, the driven shaft is preferably connected directly to the output of the offset gear. Furthermore, the driven shaft may generally also be connected directly to the wheel hub.

The offset gear is preferably arranged within the first lubrication space in that at least one drive gear forming the input of the offset gear, a driven gear forming the output of the offset gear and, if necessary, further components of the offset gear, in particular wheels, that couple the drive gear drive-effectively to the driven gear are arranged within the first lubrication space.

The wheel support may comprise a plurality of bearings, for example tapered roller bearings, via which the wheel hub is supported at the hub carrier. In particular, apart from these bearings of said wheel support, no other bearings are provided that support the wheel hub directly at another component of the wheel side. The wheel support is preferably arranged within the second lubrication space in that all the bearings via which the wheel hub is supported at the hub carrier are arranged within the second lubrication space.

The lubrication spaces may be separate from one another in particular in that they are clearly spatially delimited from one another structurally, namely by components of the wheel side, by housing walls of an (axle) housing or by other structures. Due to the sealing, no exchange of lubricant between the lubrication spaces takes place in this respect.

The first lubrication space and the second lubrication space may in this respect be arranged adjacent to one another. If this is the case, the first lubrication space and the second lubrication space are preferably sealed directly with respect to one another, in particular by providing all the passages through which components of the wheel side, for example the driven shaft, extend from the one lubrication space into the other and also all other openings between the lubrication spaces (if any) with appropriate seals. In particular depending on the components of the wheel side between which a respective seal is arranged, a static or dynamic seal may be provided in this respect.

However, the first lubrication space and the second lubrication space do not necessarily have to be sealed directly with respect to one another since they are not necessarily arranged directly adjacent to one another. A third lubrication space may in particular also be provided along the power flow of the drive power between the first lubrication space and the second lubrication space, as will be explained further below.

Due to the separate lubrication spaces, complex lubricant courses may be avoided since the lubrication is limited in each case to the components arranged in the respective lubrication space. Furthermore, the separate lubrication spaces make it possible to individually optimize the lubrication specifically with respect to the components arranged in the respective lubrication space, for example with respect to the type and/or the quantity of the lubricant used in each case.

Different lubricants may in particular be used for the components arranged in the different lubrication spaces, said lubricants being specifically suitable for the respective components. For example, provision may be made in accordance with an advantageous embodiment that the offset gear is oil-lubricated, while the wheel support is grease-lubricated.

In accordance with a further advantageous embodiment, the wheel side may further comprise a wheel hub gear that is configured to receive drive power from the driven shaft and to output said drive power to the wheel hub, wherein the wheel side has a third lubrication space in which the wheel hub gear is arranged and which is separate from the first lubrication space and the second lubrication space and sealed with respect to the first lubrication space and the second lubrication space.

In such an embodiment, a separate lubrication space is therefore provided for a total of three different functional assemblies (offset gear, wheel support, and wheel hub gear), in which lubrication space a lubrication optimized for the respective assembly may take place.

The wheel hub gear is preferably configured as a reduction gear unit and may in particular be configured as a planetary gear set. An input element of the wheel hub gear is preferably directly connected to the driven shaft or is formed in one part therewith. An output element of the wheel hub gear is preferably directly connected to the wheel hub or formed in one part therewith.

The wheel hub gear may in particular be arranged within the third lubrication space in that at least one input element of the wheel hub gear connected to the driven shaft, one output element of the wheel hub gear connected to the wheel hub, and further components of the wheel hub gear, in particular wheels, connecting the input element to the output element in a drive-effective manner are arranged within the third lubrication space.

The third lubrication space is separate from the first and the second lubrication space and is sealed with respect to the first and the second lubrication space. In particular, the third lubrication space may be arranged adjacent to both the first lubrication space and the second lubrication space and is then preferably directly sealed both with respect to the first lubrication space and with respect to the second lubrication space. For this purpose, provision may be made that all the passages through which components of the wheel side, for example the driven shaft or the wheel hub, extend from one of the lubrication spaces into another and also all other openings between two respective lubrication spaces (if any) are provided with appropriate static or dynamic seals.

In accordance with an advantageous embodiment, the second lubrication space is arranged axially between the first lubrication space and the third lubrication space with respect to the output axis. This does not preclude the axial extent of the second lubrication space from at least partly overlapping with the axial extent of the first lubrication space and/or with the axial extent of the third lubrication space. However, the first lubrication space is preferably arranged entirely or at least partly at a first side of the axial extent of the second lubrication space and the third lubrication space is arranged entirely or at least partly at a second side of the axial extent of the second lubrication space opposite the first side. In this respect, it is further preferred that at least either the first lubrication space does not also extend up to the second side or the third lubrication space does not also extend up to the first side.

In accordance with an advantageous embodiment, the first lubrication space is arranged entirely at a first side of the axial extent of the second lubrication space with respect to the output axis, while the third lubrication space is arranged partly at a second side of the axial extent of the second lubrication space opposite the first side with respect to the output axis and extends up to the first side. In other words, the third lubrication space extends along the output axis from said second side along the total axial extent of the second lubrication space up to said first side. In this respect, the third lubrication space may in particular extend radially within the second lubrication space through the latter. At the first side, the third lubrication space in this respect adjoins the first lubrication space and is sealed with respect to the first lubrication space by a seal. Such an arrangement of the seal between the first and the third lubrication space at the first side, i.e. at that side of the axial extent of the second lubrication space at which the first lubrication space is completely located, may advantageously contribute to easy accessibility of the seal.

Since the wheel hub gear is arranged in a different lubrication space than the wheel support, different lubricants may be used for these two assemblies. Provision may in particular be made in accordance with an advantageous embodiment that the wheel support is grease-lubricated, while the wheel hub gear is oil-lubricated. Since the offset gear is also arranged in its own lubrication space, the respective ideal lubrication situation may be provided for each of the lubrication spaces by the independent selection of the respective lubricant and the independent type of the lubricant guidance within the respective lubrication space.

In accordance with an advantageous embodiment, the wheel side comprises a motor, in particular an electric motor, that is drive-effectively connected to the input of the offset gear in order to deliver drive power to the offset gear.

The invention also relates to a portal axle for a motor vehicle, comprising two wheel sides of the explained kind that are connected to one another via an axle bridge. Such portal axles are in particular used in low-floor buses, for example in local transport and city buses, where as large as possible a free space (with respect to the vertical depth and also the horizontal width) is desired for the passengers.

BRIEF DESCRIPTION OF THE DRAWINGS

The invention will be further explained below by way of example with reference to the drawings, in which.

DETAILED DESCRIPTION OF THE INVENTION

Figure 1:
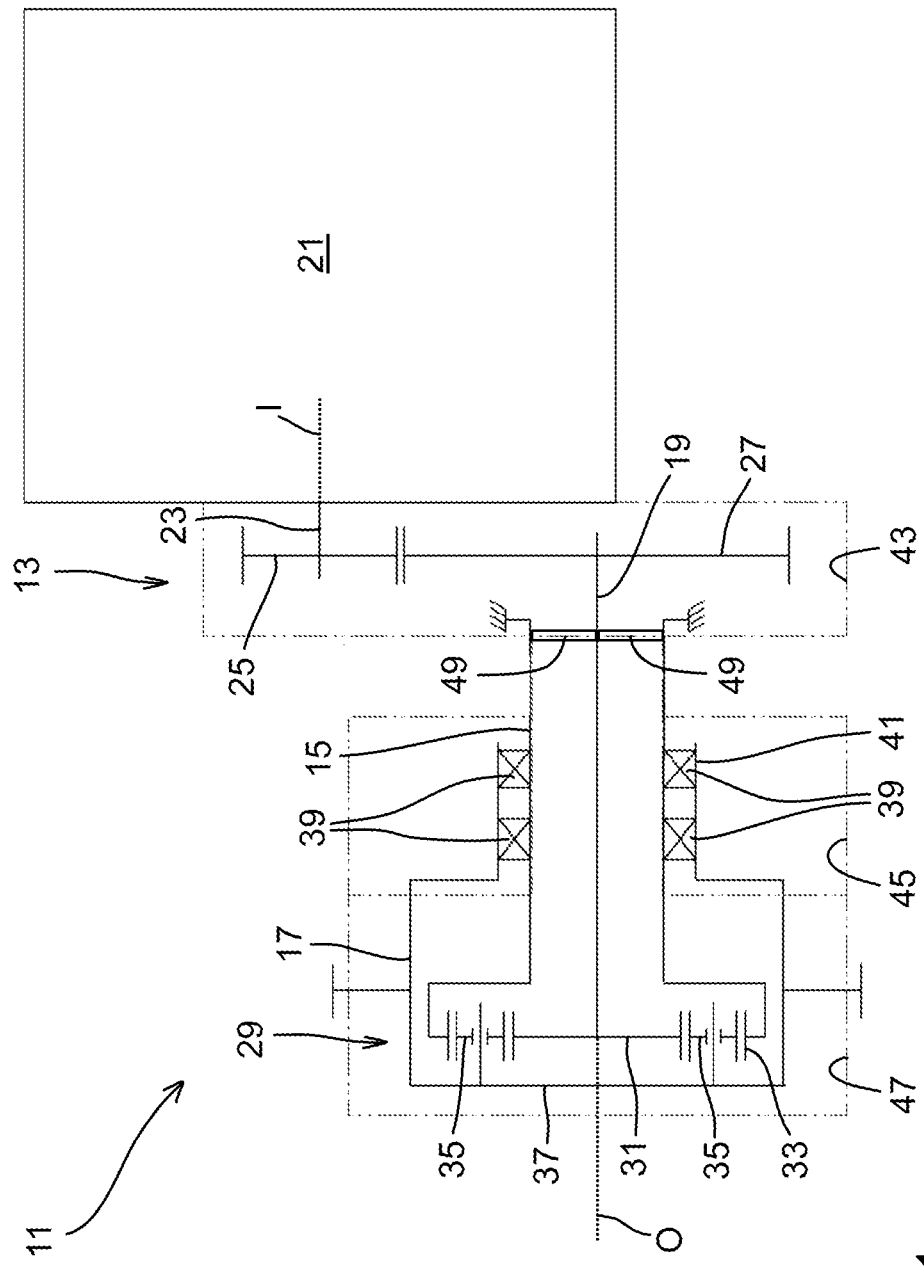
FIG. 1 shows an embodiment of a wheel side in accordance with the invention in a schematic representation.

The wheel side 11 shown in FIG. 1 generally comprises an offset gear 13, a hub carrier 15, a wheel hub 17, and a driven shaft 19 and is driven by a motor 21 that may be an electric motor. The wheel side 11 may also comprise the motor 21 that is then integrated into the wheel side 11. The drive power output by the motor 21 is transmitted to the offset gear 13 via a drive shaft 23. For this purpose, the drive shaft 23 is connected to a drive gear of the offset gear 13, which forms an input 25 of the offset gear 13, for a common rotation about an input axis I. The drive shaft 23 and the drive gear may also be formed in one part. The drive gear meshes with a driven gear of the offset gear 13 that forms an output 27 of the offset gear 13 and that is connected to or formed in one part with the driven shaft 19 for a common rotation about an output axis O.

The driven shaft 19 extends through the hub carrier 15, which is of stationary design, up to a wheel hub gear 29 that is configured as a reducing planetary gear set. In this respect, the driven shaft 19 is connected to a sun gear 31 of the wheel hub gear 19 or formed in one part therewith for a common rotation. A ring gear 33 of the wheel hub gear 19 is of stationary design and is rotationally fixedly connected to the hub carrier 15 or formed integrally at the hub carrier 15 for this purpose. The wheel hub gear 29 further has a plurality of planet gears 35 that each mesh with both the sun gear 31 and the ring gear 33. In this respect, the planet gears 35 are supported at a planetary carrier 37 that is connected to the wheel hub 17 or formed in one part with the wheel hub 17 for a common rotation. The sun gear 31, the ring gear 33, the planetary carrier 37, and the wheel hub 17 are in this respect arranged coaxially to the output axis O, just like the output element 27 of the offset gear 13 and the driven shaft 19, so that these elements, with the exception of the stationary ring gear 33, rotate about the same axis during travel.

The wheel hub 17 is supported at the hub carrier 15 by means of a wheel support 39. For this purpose, the wheel hub 17 has a support section 41 between whose inner periphery and the outer periphery of the hub carrier 15 a plurality of bearings are arranged that together form the wheel support 39. In this respect, the wheel hub 17 is directly supported at another component of the wheel side 11 solely via these bearings of the wheel support 39.

Axially with respect to the output axis O, the support section 41 and the wheel support 39 are located between the offset gear 13 and the wheel hub gear 29. In particular due to this arrangement, the wheel side 11 may, in accordance with the invention, have a first lubrication space 43, in which the offset gear 13 is arranged, and a second lubrication space 45 which is separate from the first lubrication space 43 and sealed with respect to the first lubrication space 43 and in which the wheel support 39 is arranged. Furthermore, the wheel side 11 has a third lubrication space 47 in which the wheel hub gear 29 is arranged and which is separate from the first lubrication space 43 and the second lubrication space 45 and sealed with respect to the first lubrication space 43 and the second lubrication space 45. Since the wheel support 39 is arranged between the offset gear 13 and the wheel hub gear 29 with respect to its position along the output axis O, the second lubrication space 45 is arranged between the first lubrication space 43 and the third lubrication space 47 with respect to the output axis O.

In this respect, the first lubrication space 43 is arranged completely at a first side (in the representation of FIG. 1: at the right) of the axial extent of the second lubrication space 45 with respect to the output axis O. The third lubrication space 47, on the other hand, is arranged with a substantial part at a second side (in the representation of FIG. 1: at the left) of the axial extent of the second lubrication space 45 axially opposite the first side with respect to the output axis O, but extends partly radially within the second lubrication space 45 over its total axial extent through the second lubrication space 45 up to said first side so that it may adjoin the first lubrication space 43 at the first side. Where the first lubrication space 43 and the third lubrication space 47 adjoin one another at the first side, a seal 49 is provided that seals the first lubrication space 43 and the third lubrication space 47 with respect to one another.

In the FIG. 1, the lubrication spaces 43, 45, 47 are only represented schematically by chain-dotted lines that do not reflect the actual outer contour of a respective lubrication space 43, 45 or 47. Rather, it is merely illustrated by the representation that the offset gear 13, the wheel support 39, and the wheel hub gear 29 are located as respective independent functional assemblies in different lubrication spaces 43, 45, 47 between which no lubricant exchange takes place due to the seal. In this way, different lubricants may be used for the lubrication of the different functional assemblies. For example, an oil may be provided as a lubricant for the offset gear 13 in the first lubrication space 43, the same or a different oil may be provided as a lubricant for the wheel hub gear 29 in the third lubrication space 47, and a grease may be provided as a lubricant for the wheel support 39.

Thus, the additional effort of providing two, preferably three, mutually separate lubrication spaces 43, 45, 47 in the wheel side 11 in accordance with the invention and reliably sealing them with respect to one another is compensated in that the most suitable lubricant may be used in each case for the components to be lubricated of the different functional assemblies of the wheel side 11 and that overall a lubricant situation that is individually optimized for each assembly may be provided. Furthermore, due to the design of the wheel side 11 in accordance with the invention, complex structures for guiding lubricant across the total wheel side 11 are not necessary.

Figure 2:
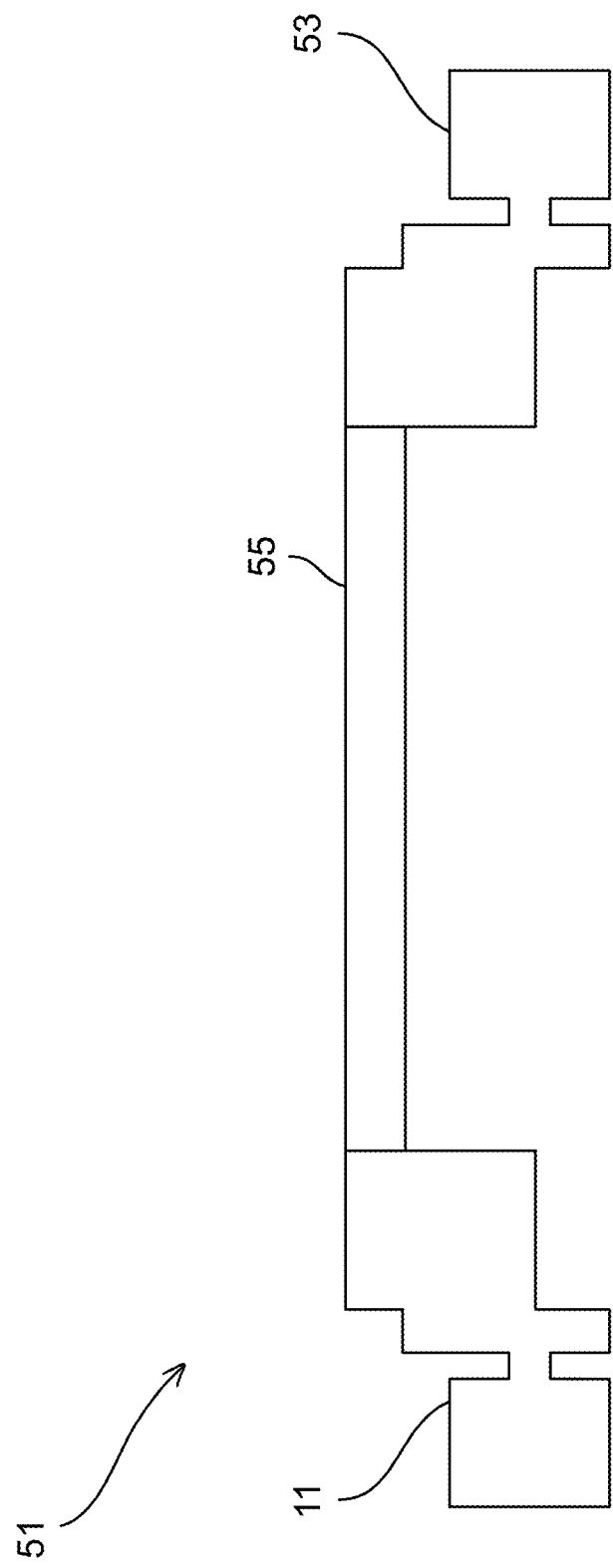
FIG. 2 shows an embodiment of a portal axle, the wheel side, an axle bridge, and another wheel side.

In one aspect, shown in FIG. 2, the wheel side 11 is installed in a portal axle 51 along with another wheel side 53, having the same features as the wheel side 11, where the wheel sides 11, 53 are connected to one another via an axle bridge 55.

The invention claimed is:

1. A wheel side comprising:
    an offset gear having an input coaxial to an input axis for receiving drive power and an output coaxial to an output axis, which is offset with respect to the input axis, for outputting the drive power;
    a hub carrier;
    a wheel hub supported at the hub carrier by means of a wheel support; and
    a driven shaft extending along the output axis through the hub carrier and which connects the offset gear to the wheel hub in order to transmit the drive power from the offset gear to the wheel hub,
    wherein the wheel side has a first lubrication space within which the offset gear is arranged, and a second lubrication space within which the wheel support is arranged, with the first lubrication space and the second lubrication space being separate from one another and sealed with respect to one another.

2. The wheel side in accordance with claim 1, wherein the offset gear is oil-lubricated and the wheel support is grease-lubricated.

3. The wheel side in accordance with claim 1, further comprising:
a wheel hub gear that receives the drive power from the driven shaft and outputs the drive power to the wheel hub,
wherein the wheel side has a third lubrication space within which the wheel hub gear is arranged and which is separate from the first lubrication space and the second lubrication space and sealed with respect to the first lubrication space and the second lubrication space.

4. The wheel side in accordance with claim 3, wherein the second lubrication space is arranged between the first lubrication space and the third second lubrication space.

5. The wheel side in accordance with claim 3, wherein the first lubrication space is arranged entirely at a first side of an axial extent of the second lubrication space, and wherein the third lubrication space is arranged partly at a second side of the axial extent of the second lubrication space opposite the first side and extends up to the first side at which said third lubrication space adjoins the first lubrication space and is sealed with respect to the first lubrication space by a seal.

6. The wheel side in accordance with claim 3, wherein the wheel support is grease-lubricated and the wheel hub gear is oil-lubricated.

7. The wheel side in accordance with claim 1, comprising a motor that is drive-effectively connected to the input of the offset gear.

8. The wheel side in accordance with claim 7, wherein the motor is an electric motor.

9. The wheel side in accordance with claim 1, installed in a portal axle together with another wheel side in accordance with claim 1, wherein the wheel sides are connected to one another via an axle bridge.

\* \* \* \* \*